United States Patent
Stutz et al.

(10) Patent No.: US 11,789,148 B2
(45) Date of Patent: Oct. 17, 2023

(54) ELECTRO-OPTICAL DISTANCE METER AND DISTANCE MEASURING METHOD

(71) Applicant: HEXAGON TECHNOLOGY CENTER GMBH, Heerbrugg (CH)

(72) Inventors: Reto Stutz, Berneck (CH); Jürg Hinderling, Marbach (CH); Andreas Walser, St. Gallen (CH)

(73) Assignee: HEXAGON TECHNOLOGY CENTER GMBH, Heerbrugg (CH)

(*) Notice: Subject to any disclaimer, the term of this patent is extended or adjusted under 35 U.S.C. 154(b) by 650 days.

(21) Appl. No.: 16/691,444

(22) Filed: Nov. 21, 2019

(65) Prior Publication Data
US 2020/0166643 A1 May 28, 2020

(30) Foreign Application Priority Data

Nov. 22, 2018 (EP) .................................. 18207757

(51) Int. Cl.
*G01S 17/10* (2020.01)
*G01S 17/36* (2006.01)
*G01S 17/88* (2006.01)
*G01S 7/4861* (2020.01)
*G01S 7/4865* (2020.01)

(52) U.S. Cl.
CPC ............ *G01S 17/10* (2013.01); *G01S 7/4861* (2013.01); *G01S 7/4865* (2013.01); *G01S 17/36* (2013.01); *G01S 17/88* (2013.01)

(58) Field of Classification Search
None
See application file for complete search history.

(56) References Cited

U.S. PATENT DOCUMENTS

| 8,705,953 | B2 | 4/2014 | Schriefer et al. |
| 9,599,713 | B2 | 3/2017 | Giger et al. |
| 10,222,474 | B1* | 3/2019 | Raring .................. H01S 5/4012 |
| 10,371,802 | B2* | 8/2019 | Liu ........................ H03K 5/133 |
| 10,451,736 | B2 | 10/2019 | Stutz |
| 10,634,788 | B2* | 4/2020 | Rohner ................. G01S 7/4911 |
| 10,718,866 | B2* | 7/2020 | Wohlgenannt .......... G01S 17/10 |

(Continued)

FOREIGN PATENT DOCUMENTS

| CN | 104024878 A | 9/2014 |
| CN | 105988119 A | 10/2016 |

(Continued)

OTHER PUBLICATIONS

Boudreau, S. et al., "Remote range resolved chemical detection using dual comb interferometry", CLEO: Science and Innovations, pp. 1-2 (Jun. 2013).

(Continued)

*Primary Examiner* — Reza Aghevli
(74) *Attorney, Agent, or Firm* — Maschoff Brennan

(57) ABSTRACT

An electro-optical distance meter and a distance measuring method, wherein a distance to a target is measured based on runtime by means of radiation pulses, which are emitted at a pulse rate. Received radiation pulses are digitized by means of sampling, wherein the sampling rate is set in dependence on the pulse rate, wherein a digitized signal is generated on the basis of sampling over the reception signals of a plurality of received radiation pulses.

14 Claims, 5 Drawing Sheets

(56) References Cited

U.S. PATENT DOCUMENTS

| | | | |
|---|---|---|---|
| 2013/0077084 A1* | 3/2013 | Liu | G01S 17/10 356/5.03 |
| 2013/0242283 A1 | 9/2013 | Bailey et al. | |
| 2014/0350836 A1* | 11/2014 | Stettner | G01S 7/481 356/4.01 |
| 2016/0313445 A1* | 10/2016 | Bailey | G01S 17/36 |
| 2018/0096489 A1* | 4/2018 | Cohen | G01S 17/894 |
| 2018/0172831 A1 | 6/2018 | Wohlgenannt et al. | |
| 2019/0179017 A1* | 6/2019 | Nagai | G01S 7/4915 |
| 2019/0293761 A1* | 9/2019 | Hinderling | G01S 7/4808 |
| 2020/0110159 A1* | 4/2020 | Wohlgenannt | G01S 17/42 |
| 2020/0371216 A1* | 11/2020 | Liu | G01S 7/4865 |
| 2021/0124049 A1* | 4/2021 | Wohlgenannt | G01S 7/4816 |
| 2021/0181346 A1* | 6/2021 | Piok | G01S 7/4817 |
| 2021/0254308 A1* | 8/2021 | Thibblin | G01S 17/875 |
| 2022/0171038 A1* | 6/2022 | Wohlgenannt | G01S 7/4815 |

FOREIGN PATENT DOCUMENTS

| | | | | |
|---|---|---|---|---|
| CN | 109633670 A | * | 4/2019 | G01S 17/10 |
| DE | 10 2009 012 646 A1 | | 3/2010 | |
| DE | 10 2010 013751 A1 | | 10/2011 | |
| EP | 3 339 901 A1 | | 6/2018 | |
| GB | 2566437 A | | 3/2019 | |
| JP | 2010-203877 A | * | 3/2009 | G01S 17/10 |
| JP | 2010-203877 A | | 9/2010 | |
| JP | 2010203877 A | * | 9/2010 | G01S 17/10 |
| KR | 2013-0015893 A | | 2/2013 | |
| WO | 88/05922 A1 | | 8/1988 | |
| WO | 2014/045655 A1 | | 3/2014 | |
| WO | WO-2014045655 A1 | * | 3/2014 | G01S 17/10 |

OTHER PUBLICATIONS

Jang, Y.- S. et al., "Absolute distance measurement with extension of nonambiguity range using the frequency comb of a femtosecond laser", Optical Engineering, vol. 53, Issue 12, pp. 122403-1-122403-6 (Dec. 2014).

Joo, K.N. et al., "Distance measurements by combined method based on a femtosecond pulse laser", Optics Express, vol. 16, Issue 24, pp. 19799-19806 (2008).

Wu, H. et al., "Absolute distance measurement in a combined-dispersive interferometer using a femtosecond pulse laser", Measurement Science and Technology, vol. 27, Issue 1, pp. 1-12 (Nov. 2015).

Extended European Search Report dated Jul. 23, 2019 as received in Application No. 18207757.8.

* cited by examiner

ELECTRO-OPTICAL DISTANCE METER AND DISTANCE MEASURING METHOD

CROSS-REFERENCE TO RELATED APPLICATIONS

This application claims priority to European Patent Application No. 18207757.8 filed on Nov. 22, 2018, which is incorporated herein by reference.

FIELD OF THE INVENTION

The invention relates to an electro-optical distance meter according to Claim 10 and a method for distance measuring according to Claim 1.

BACKGROUND

Various principles and methods are known in the field of electronic and/or electro-optical distance measuring. One approach is to emit pulsed electromagnetic radiation, for example, laser light, toward a target to be measured, the distance to which is to be determined, and subsequently to receive an echo from this target as a backscattering object. To make the point on the target object targeted for the measurement recognizable, visible light can be used in this case. The reflected optical radiation is converted into an electrical signal in the device by a photosensitive element. Optical components for beamforming, deflection, filtering, etc.—for example, lenses, wavelength filters, mirrors, etc.—are often located in the optical emitting and/or receiving path in this case.

The distance to the target to be measured can be determined, for example, on the basis of the runtime of the pulse or emission pattern, and/or the phase of the pulse within a modulation cycle. Such laser distance meters have become widespread by now as standard solutions in many fields, for example, geodesy or industrial surveying, for example, in the form of total stations, laser scanners, EDMs, or laser trackers. To achieve a correspondingly high accuracy of the distance measurement, the requirements on the time resolution capability for the distance measurement are quite high because of the high propagation speed of optical radiation in free space. For example, at typical measurement distances, a time resolution having an accuracy of at least approximately 6.6 ps is required for a distance resolution of 1 mm or significantly less.

The highest possible output power is desirable for the clearest possible reception signal, which is thus precisely analyzable. However, limits are predetermined for the electro-optical devices discussed here with respect to the signal power which can be emitted. Thus, in the case of the emission of laser light, the ocular safety determines a maximum permissible mean signal power which can be emitted. To nonetheless obtain sufficiently strong signal intensities for the measurement, which are detectable by the receiver, pulsed operation is therefore preferably used. Short pulses having high peak power are emitted followed by pauses without signal emission. The reflected component of the pulses thus has a sufficiently high intensity to be able to evaluate them with high signal-to-noise ratio from the background interference and the noise, in particular also upon the presence of background light (sunlight, artificial illumination, etc.).

Known light sources having pulse or modulation sequences of high peak power synchronous with the system are, for example, electronically pulsed laser diodes or superluminescent light-emitting diodes combined with optical amplifiers. All of these light sources have the disadvantage that the pulses are multiple hundreds of picoseconds long and in the case of measurements on rough natural surfaces, generate distance measurement errors of typically 0.1 mm to 2 mm due to spatial and chromatic irregularities.

Quality-switched (Q-switched) solid-state lasers are known, having quite short pulses up into the range of 200 ps and a pulse rate of a few megahertz. One disadvantage, in contrast, is the chronological noise of the pulse rate, this is generally 1% to 5% of the pulse interval. The handling of this irregularity in precise distance measuring systems requires a complex device and correspondingly demanding analysis methods.

Distance meters having stabilized frequency comb lasers are also known in the field of interferometric distance measurement using pulsed operation, for example, from DE 10 2009 012 646 A1. These comprise tunable resonators for high-precision distance measurements (ppm accuracy), to stabilize the pulse rate or pulse frequency—typically at pulse lengths around 100 fs—so that it is regulated with ppm accuracy, and also CEP stabilization (carrier envelope phase). This stabilization effectuates consistency of the optical wavelength and phase. Such devices and/or methods also have the disadvantage, however, of a high complexity and a high expenditure in production, use, and maintenance accompanying this.

To ascertain the runtime of the signal, on the one hand, the so-called phase measurement principle is known, which ascertains the signal runtime by comparison of the phasing of the amplitude modulation of the emitted and received signals.

On the other hand, the so-called time-of-flight (TOF) method is known, which ascertains the time between the emission and reception of a light pulse, wherein the time measurement is performed on the basis of the flank, the peak value, or another characteristic of the pulse form. Pulse form is understood in this case as a chronological light intensity curve of the reception signal, especially of the received light pulse—acquired by the photosensitive element. In this case, the point in time of the emission can be ascertained either on the basis of an electrical triggering pulse of the signal applied to the emitter or on the basis of the above-mentioned reference signal.

Ambiguities can occur in the distance measurement in this case if the signal runtime exceeds the reciprocal of the pulse emission rate and thus multiple identical signals are underway simultaneously between device and measurement object, whereby a reception pulse can no longer be unambiguously associated with its respective emission pulse. It is therefore unclear without further measures whether the distance or the partial distance as a division remainder was measured by the emission pulse period.

Two different approaches or a combination thereof are usually used for detecting the backscattered pulse.

In the time-of-flight method according to the so-called threshold value principle, a light pulse is detected when the intensity of the radiation incident on a detector of the utilized distance measuring device exceeds a certain threshold value. This threshold value prevents noise and interference signals from the background incorrectly being detected as a useful signal, i.e., as backscattered light of the emitted pulse.

The other approach of the time-of-flight method is based on the sampling of the backscattered pulse. This approach is typically used in the case of weak backscattered signals (for example, pulse signals), for example, as are caused by greater measurement distances, or generally to enhance the measurement accuracy. An emitted signal is detected by sampling the radiation acquired by a detector, identifying a signal within the sampled range, and finally chronologically determining a location of the signal. A useful signal can also be identified under unfavorable circumstances by the use of a plurality of sampled values and/or summation of the reception signal synchronous with the emission rate, so that greater distances or background scenarios which are noisy or subject to interference can also be managed. In the case of the approach of the chronologically very precise sampling of the backscattered signal, the electrical signal generated by the detector is converted by means of an analog-to-digital converter (ADC) into a digital signal sequence.

In rapid analog-to-digital converters (ADC), a high sampling rate is achieved in conjunction with a high resolution of the signal amplitude (for example, 1 GS/s, 14 bit), for example, by generating multiple ADC conversion steps, for example, by chronological interleaving of multiple slow ADC conversion steps, step-by-step quantification of the sampled signal amplitudes ("pipelining"), or in combination a multistep quantification of the signal sampling values of multiple ADC conversion steps. Such ADCs and/or such methods have the disadvantage of the high complexity, which is also reflected in high production costs.

SUMMARY

The object of some aspects of the present invention is therefore to provide a simple or simplified distance meter and distance measuring method, using which high precision, in particular absolute, distance measurements are enabled.

This object is achieved by the implementation of the characterizing features of the independent claims. Features which refine the invention in an alternative or advantageous manner can be inferred from the dependent patent claims.

Some aspects of the invention relate to a method for distance measuring. In the scope of the distance measuring method, an emission of pulsed optical radiation is performed at a pulse rate which is preferably at least 1 MHz. The radiation is preferably generated by a frequency comb laser in this case. Furthermore, a reception of a fraction of the optical radiation reflected from a target object using a photosensitive electrical receiving element and a conversion into an electrical reception signal, a sampling of the optionally filtered reception signal at a sampling rate, so that a digitized signal is generated on the basis of sampling points generated in this case, and an analysis of the digitized signal to determine the signal runtime between emission and reception to ascertain the distance on the basis of the signal runtime are performed.

The sampling rate is set in this case in dependence on the pulse rate, wherein preferably the sampling rate is at least ten times the pulse rate. Furthermore, the sampling takes place over a plurality of received radiation pulses. Preferably for this purpose, the pulse rate is measured, in particular progressively, and the sampling rate is set, in particular progressively, in dependence on the measured pulse rate. The resulting sampling rate is optionally also absolutely determined in this case by means of an external and/or independent time base (for example, using a counter). Alternatively, pulse rate and, adapted thereto, also the sampling rate are set, in particular progressively, on the basis of predetermined clock rates, wherein the clock rate is generated, for example, by means of an independent clock generator.

The sampling rate is preferably set in a ratio to the pulse rate such that sampling rate and pulse rate are phase locked in relation to one another. The sampling rate is preferably set in this case so that it is a non-integer multiple of the pulse rate, wherein, for example, either of the following applies for the ratio of sampling rate to pulse rate:

sampling rate=pulse rate*(N+1/x) or:

sampling rate=pulse rate*(N−1/x), wherein N is a natural number and x is the plurality of received radiation pulses.

The sampling rate is optionally substantially less than the bandwidth of the receiving unit (undersampling) and/or the pulse-rate-dependent setting of the sampling rate is performed algorithmically, i.e., a computer, analysis-side adaptation of the sampling rate—for example, as resampling—to the pulse rate.

In one refinement, the digitized signal is generated by the sampling points of the plurality of the received radiation pulses being accumulated, wherein this preferably takes place without association with respect to the individual radiation pulses. Alternatively or additionally, the sampling points are used to optimize parameter values of polynomials, which describe the signal or the signal form, in particular in real time.

In this case, the sampling is optionally performed in such a way that the sampling points repeat after the plurality and a multiple of the repeating sampling points is used for generating the digitized signal. In other words, a sampling pattern repeats after a certain number of sampling points, so that sampling of the pulses occurs at repeating points in time and then, for example, accumulation occurs over multiple such repetitions. After x pulses, the sampling pattern on the pulse form thus repeats in each case.

In a further refinement, a setting of a (slight) asynchronicity of the sampling rate in relation to the pulse rate is performed by an additional fraction (y, for example, expressed as ppm) greater than a multiple of the emission pulse rate, in particular at most one-millionth, so that a (controlled) phase slip and/or sampling without repetition of sampling points occurs. This phase slip by means of frequency offset is optionally also combinable with the above-described ratio of sampling rate to pulse rate, thus formally expressed as:

sampling rate=pulse rate*(N±1/x)*(1+y)

In this case, the sampling rate is optionally cumulatively displaced by this fraction from sample to sample. In the case of an accumulation over a time $T_{Acc}$, the sampling pattern thus shifts by a time $\Delta T$ in relation to the laser pulse:

$\Delta T = y * T_{Acc}$

As a further option, possible ambiguities in the distance determination are resolved by means of discrete and/or analog modulation of the radiation pulse sequence, wherein optionally a determination of the number of the radiation pulses between emission and reception is performed in this case.

Some aspects of the invention moreover relate to an electro-optical distance meter, in particular a laser distance meter. The distance meter comprises a radiation source for generating pulsed radiation at a pulse rate, and also an optical objective and a photosensitive component, in particular a photodiode, for receiving a fraction of the radiation reflected from a target object and converting it into a reception signal, and an analog-to-digital converter (ADC) for digitizing the reception signal by means of sampling at a sampling rate. In addition, the distance meter comprises an electronic analysis unit or analysis electronics unit, which ascertains a distance between distance meter and target object on the basis of a signal runtime by means of the digitized reception signal, wherein the distance is preferably absolutely measurable.

The distance meter furthermore comprises a sampling functionality, upon the execution of which the sampling rate is set in dependence on the pulse rate, wherein the sampling rate is preferably at least ten times as large as the pulse rate. Furthermore, the sampling for the digitizing of the respective reception signal used for a distance ascertainment takes place over a plurality of x received radiation pulses.

In one preferred embodiment, the radiation source is a freewheeling, non-frequency-stabilized frequency comb laser. The frequency comb laser is optionally designed to generate pulses having a pulse duration between 100 fs and 10 ps and/or is designed as a micro-frequency comb laser having at least one monolithic micro-resonator (Optical Whispering-Gallery Mode Resonator).

The distance meter is preferably designed to acquire the pulse rate, preferably progressively, for example, by means of a device-internal radiation detector, and to set the sampling rate in dependence on the acquired pulse rate, in particular by means of a phase-locked loop (PLL), preferably progressively and/or asynchronously. The distance meter optionally comprises a first clock generator, in particular a phase-locked loop (PLL), which generates the sampling rate by means of the acquired pulse rate, for setting the sampling rate on the basis of the measured pulse rate, so that the laser is used as a low noise time base for the first clock generator, wherein the first clock generator relays the pulse rate to a further unit to measure the exact pulse rate of the laser. This is performed, for example, in an FPGA which is clocked by an accurate time base (TCXO, OCXO). The knowledge of the accurate sampling rate is the basis of the accurate distance ascertainment.

The distance meter optionally comprises at least one independent clock generator, in particular a temperature-compensated (crystal) oscillator (TCO and/or TCXO or OCXO), for generating an independent clock rate. Upon execution of the sampling functionality, the sampling rate and the pulse rate can then be set on the basis of the clock rate, preferably progressively. Additionally or alternatively, the absolute frequency of the radiation can be determined progressively on the basis of the clock rate, wherein the distance meter is designed to continuously compute a sampling-to-distance factor, so that the distance determination is enabled with a scale error less than 10 ppm, but also less than 1 ppm.

The photosensitive electrical component optionally has a bandwidth in the gigahertz range, wherein it is optionally designed as an avalanche photodiode (APD) or single-photon avalanche photodiode (SPAD) array. As a further option, the distance meter comprises a fiber-optic radiation amplifier and/or an internal reference target, wherein an optical reference path can be provided on the basis of the reference target for the absolute referencing of the distance ascertainment.

The distance meter preferably comprises a modulator for modulation of the laser pulses to resolve ambiguities in the ascertainment of the distance, in particular a variable optical attenuator (VOA) outside the laser cavity for generating an amplitude-modulated signal at constant frequency. A modulation alternatively or additionally takes place by means of a pulse picker, which, for example, at an original pulse rate of 10 MHz, only transmits every ninth or tenth pulse into an optical amplifier and/or for emission onto the target. As a further option for resolving ambiguities, the device comprises an electro-optical phase shifter in the interior of a cavity of the laser for generating at least two different pulse sequence frequencies.

The distance meter is optionally designed for spectral interferometry. In this case, frequency tuning of the pulse rate is performed as an option in the scope of the distance determination, so that by means of pulse overlap, interference between a reference pulse and a reception pulse is usable, and/or a spectral allocation of the received pulses by means of a dispersive element, in particular a grating or virtual imaged phased array (VIPA), and intensity measurement by means of a camera of the distance meter and/or a reduction of the pulse interval by means of a reception-side ring cavity of the distance meter, preferably in the reference light path, and/or a widening of the pulse form (pulse stretching) by means of decoupling Fabry-Perot cavity and grating of the distance meter.

The method according to some aspects of the invention and the device according to some aspects of the invention offer the advantage that precise distance measurements are also enabled using cost-effective components, above all a simple ADC and simple frequency comb laser, down to resolutions in the micrometer or nanometer range, even in the case of large distances to the target (500 m or more). A simple ADC is characterized, inter alia, by a comparatively low sampling rate, low power consumption, and systematic error influences such as inaccurate internal calibration.

Due to the coupling or adaptation of the sampling rate to the pulse rate, high or rather elevated final sampling rates and/or a high density of sampling points can nonetheless be provided, even at pulse rates in the megahertz range, wherein to further reduce the complexity in the multiple sampling, an association of sampling points with the "original" reception signals can be omitted.

Frequency comb lasers offer the advantage in this case that because of the very short pulse duration, the interfering influences of so-called speckles are drastically reduced in comparison to other lasers, which has an advantageous effect on the measurement precision with signal runtime in particular in the case of targets having uneven surface. The frequency comb laser of the device comprises neither a pulse rate stabilization nor a CEP stabilization, this substantially reduces the complexity, the structural size, and the costs. Frequency comb lasers without stabilization of the pulse rate and optical carrier phase have extremely short pulses and therefore small spatial and chromatic irregularities. The problem is solved by the proposed setting of the sampling rate in dependence that the laser pulse rate of an unstabilized frequency comb laser runs asynchronously as such in relation to the ppm-accuracy or sub-ppm-accuracy electronic master oscillator of a distance measuring system.

In addition, a so-called distance jitter is substantially avoided by the present invention. It is even sufficiently small that interferometric distance measurements are enabled, although neither an active pulse-to-pulse stabilization nor a stabilization of the optical phase is performed. The short laser pulses, for example, in the femtosecond range, enable accurate single shot measurements, also at short distances (for example, less than 20 m) and also having a small number of received photons per reception pulse. The so-called shot noise level of a distance measurement is well below one micrometer.

BRIEF DESCRIPTION OF THE DRAWINGS

The method according to the invention and the device according to the invention are described in greater detail solely by way of example hereafter on the basis of specific exemplary embodiments schematically illustrated in the drawings, wherein further advantages of the invention are also described.

In the specific figures.

DETAILED DESCRIPTION

Figure 1A:
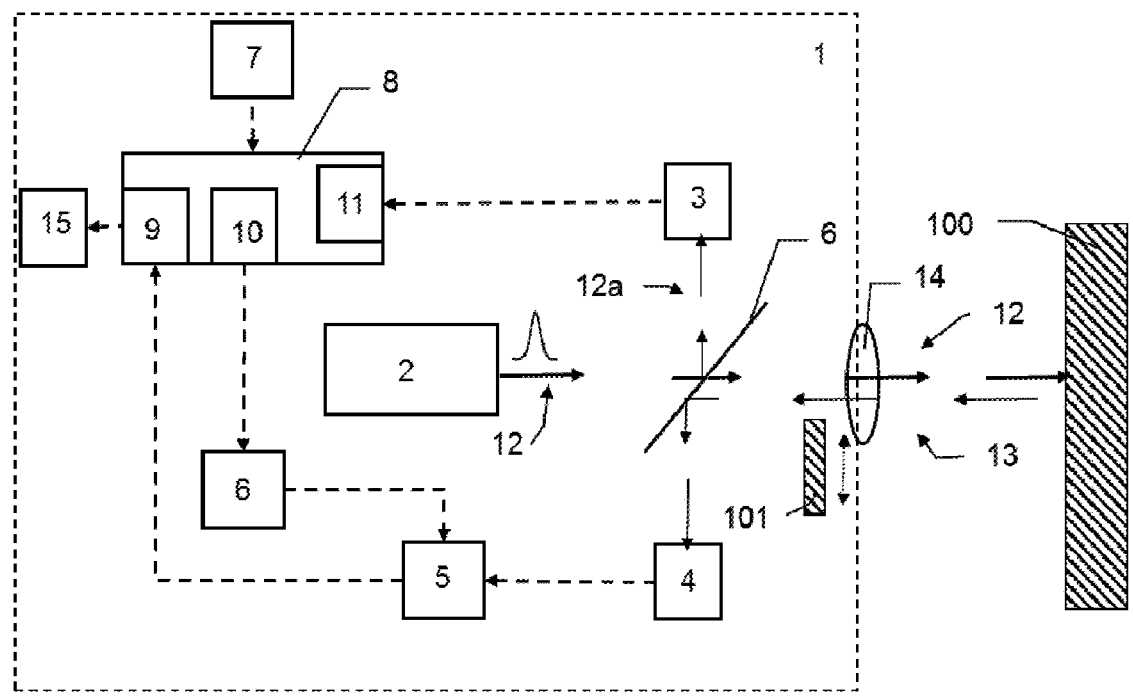
FIGS. 1a,b each show an exemplary embodiment of a distance meter and/or distance measuring method according to the invention.

FIG. 1a shows a first exemplary embodiment of a distance meter 1 and/or distance measuring method according to the invention. The distance meter 1 comprises a freewheeling, preferably single-mode-fiber-based frequency comb laser 2, which generates radiation pulses 12. The radiation 12 accordingly has a specific pulse rate, for example, between 5 and 25 MHz, wherein it is not (permanently) predetermined or fixed because of the freewheeling or the absence of frequency stabilization of the laser 2.

The respective pulse duration is preferably between 100 fs and 10 ps in this case, wherein the pulse length is fixable, for example, by means of dispersive elements. As an option, the laser is designed as a micro-frequency comb laser having a monolithic micro-resonator for generating a soliton pulse sequence. As a further option, the laser 2 comprises an optical, for example, fiber-based amplifier unit, for example, an erbium-doped fiber amplifier (EDFA) having single-mode fiber (see also FIG. 1b). At peak powers greater than 5 kW, fibers having large core diameter of, for example, 25 µm can be used (not shown) to avoid undesired pulse widening or saturation. Further examples of utilized optical amplifiers are YDFA (ytterbium-doped fiber amplifier) or those based on bismuth-doped glasses.

The laser pulses 12 are emitted via an optical objective arrangement 14 toward a target 100, wherein a part of the pulses 12a are decoupled by means of a partially-transmissive mirror 6s, so that the radiation 12 is partially deflected onto a photodetector 3, for example, a gigahertz photodiode. Pulses 13 reflected from the target 100 are guided by means of a receiving unit, in the example by means of the objective 14 (or an additional receiving objective arrangement) and the mirror 6s onto a further photosensitive electrical component 4. The detector 4 preferably has a bandwidth in the gigahertz range and is, for example, an avalanche photo-diode (APD) or a single-photon avalanche photodiode array (SPAD). The detector 4 behaves in an energy-sensitive manner, so that the electrons released by the ultrashort laser pulses are not lost, but rather contribute to the electrical detector signal.

As a further option (not shown), the distance meter 1 comprises a fiber-optic, for example, doped radiation amplifier on the receiver side. The electrical reception signal of the photosensor 4 is transferred to an analog-to-digital converter (ADC) 5, where it is digitized by means of sampling at a sampling rate. The distance meter 1 optionally comprises, in a manner known per se, a signal filter connected upstream of the ADC 5 in this case for improving the signal-to-noise ratio.

The sampling rate is set in this case in dependence on the pulse rate, wherein the sampling rate is preferably at least ten times the pulse rate. In the example, this pulse-rate-dependent setting is performed by the pulse rate being progressively (continuously) measured by means of the detector 3 and a counter 11, wherein in the example, the counter 11 is integrated into an integrated circuit (preferably a field programmable gate array (FPGA)) 8, to which the signal of the detector 3 is conducted. A TCX oscillator 7 having sub-ppm accuracy, for example, is preferably used as a precise reference time base for the counter 11. As an alternative, the pulse rate is measured by the ADC 5 itself. The sampling rate is optionally less than the reception bandwidth.

In the example, the sampling rate of the ADC 5 is set in a phase-locked or (controlled or controllable) phase-slipping manner in relation to the measured pulse rate in dependence on the measured value of the counter 11, i.e., in dependence on the pulse rate by means of a synthesizer 10 and a phase-locked loop (PLL) 6. The laser 2 is thus used as a low-noise time base for the clock-generating PLL. In this case, the sampling rate is progressively controlled on the basis of the respective present laser pulse rate.

In alternative possible embodiments having a regulated, stable (but thus more complex) radiation source, a (progressive) measurement of the pulse rate can be omitted, and it can, for example, be determined at most during the (initial) start and possibly at longer time intervals.

Alternatively to the illustrated setting of the sampling rate on the basis of the measured pulse rate, both sampling rate and also pulse rate are set "externally", for example, by means of an independent clock generator 7, so that the sampling rate is adapted to the pulse rate and, for example, asynchronicity of the sampling rate in relation to the pulse rate is provided, wherein asynchronicity is also understood as a pseudo-asynchronicity. Any type of targeted or active regulation of the sampling rate and/or the pulse rate can also be omitted, so that sampling rate and pulse rate are "randomly" different (at least with very great probability and/or except for negligible moments).

A clock generator 7 is optionally used to progressively determine the absolute frequency of the radiation 12 and/or 13 on the basis of the clock rate, wherein the distance meter 1 is designed to compute a sampling-to-distance factor progressively. This option enables a determination of the distance to the target 100 to take place with a scale error less than 10 ppm or even also less than 1 ppm.

The ADC 5 samples the reception signal using the sampling rate set as a function of the pulse rate. The sampling for producing a digitized reception signal, on the basis of which the distance value to the target 100 is finally determined by means of an electronic analysis unit 15 based on signal runtime between emission and reception, is performed in this case over multiple received radiation pulses 13.

The sampling values of the ADC 5 of a plurality of pulses 13 are compiled, in particular added, by means of a signal accumulator 9, wherein an association of sampling points with respective pulses 13 is omitted. An assignment-free consideration of all sampling points of the plurality of pulses 13 together is thus performed by means of the signal accumulator 9. A type of artificial sampling rate thus results, which is higher by a factor x than the actual sampling rate of the ADC 5, wherein x specifies the minimum number of the sampled received pulses 13. After x pulses, the sampling points repeat on the signal pulses and/or the sampling pattern repeats.

Due to the accumulation of the sample values, finally the analog reception signal or signals 13 is/are sampled sufficiently densely that the desired distance is determinable very accurately with sufficient precision from the digitized signal thus provided. The number x can also be considered to be the length of the interval of the beat frequency between the two frequencies fs and flaser $$x*S=(N+1)*P \text{ where } N \text{ is a natural number}$$

and/or as the least common multiple.

Due to such sampling using accumulation, systematic errors such as crosstalk or ADC nonlinearities of the optical and electronic signal channels average out. The distance measurement is therefore free of interference and thus much more accurate than conventional distance measuring units. Optionally, the measured laser pulse rate referenced to a TCXO or VCXO is also used in this case as a picosecond-accurate time base for the distance measurement.

As an alternative to an accumulation of the sampling points of the plurality x of pulses 13, an optimization, in particular running in real time, of parameter values of polynomials which describe the digitized signal is performed on the basis of the sampling points of the x pulses 13. The sampling points obtained on the basis of many pulses 13 are thus used in this variant for generating the digital signal by a mathematical description of the signal being specified on the basis of the sampling values or, in other words, support values of a functional representation of the desired signal being determined, wherein the laser pulse rate specifies the intervals of the support values. One advantage of such a type of the algorithmic setting of the sampling rate in dependence on the laser pulse rate is that the signal is already available as a function and no longer has to be converted, whereby the sampling memory is comparatively small and is moreover independent of the sampling frequency.

As a further alternative to an accumulation of the sampling points of the plurality x of pulses 13, an optimization, also running in real time, of parameter values which describe the runtime by means of signatures derived from the reception signals is performed on the basis of the sampling points of the x pulses 13. This signal representation is solely mathematical, can be acquired in tabular form, and saves storage space, because the sampling data are only temporarily stored.

In the exemplary embodiment according to FIG. 1*a*, the distance meter 1 additionally comprises an internal reference target 101. It can be pivoted into the beam path, so that a reference light path of known distance can thus be provided. This enables a determination of the distance zero point of the distance measurement (for example, on location or immediately before the distance measurement to the target 100), so that distances between the setup position of the instrument and targets 100 are measurable absolutely.

As a further option (not shown), the distance meter 1 is designed for spectral interferometry for the distance determination. In this case, a frequency tuning of the pulse rate is performed in the scope of the distance measurement, for example, so that interference between an internal reference pulse and a reception pulse 13 is usable by means of pulse overlap. Additionally or alternatively, a spectral division of the received pulses 13 is performed by means of a dispersive element, for example, a grating or virtual imaged phased array (VIPA), and/or an intensity measurement by means of a camera, which the distance meter 1 comprises. The distance meter 1 also optionally comprises a ring cavity for the reception-side reduction of the pulse interval and/or a strongly decoupling (high loss) Fabry-Perot cavity and grating for widening the pulse form (so-called pulse stretching).

Figure 1B:
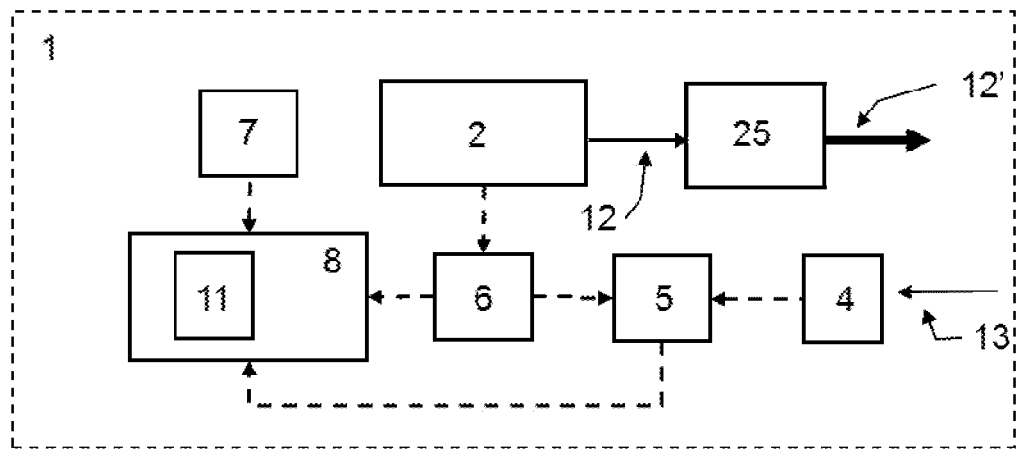
Figure 2:
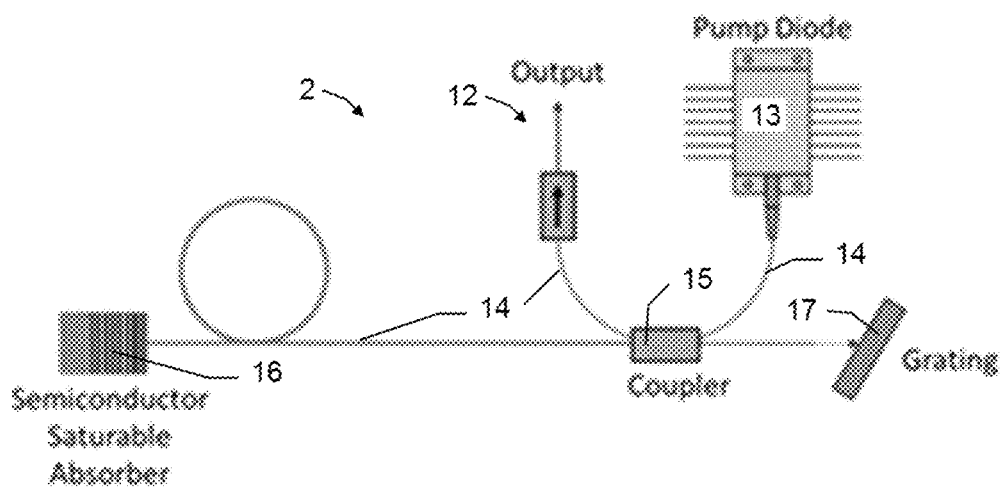
FIG. 2 shows a preferred embodiment of a freely oscillating frequency comb laser.

FIG. 1*b* shows a second exemplary embodiment of a distance meter 1. For simplification, the illustration of, inter alia, the target and optical units is omitted in contrast to FIG. 1*a*. In this example, the radiation 12 generated by the frequency comb laser 2 is amplified by an optical amplifier 25, for example, an EDFA, so that amplified radiation pulses 12' are emitted. The comb laser 2 is thus used as a seed laser for the optical amplifier 25. Moreover, the frequency comb laser 2, more precisely the pulse rate generated thereby, is used as an input for a phase-locked loop 6 (for this purpose, for example, a photodiode for laser radiation detection is integrated in the frequency comb laser). The PLL 6 is used for controlling or setting the sampling rate of the analog-to-digital converter 5 in dependence on the pulse rate. By means of the ADC 5 thus set, the target radiation pulses 13 detected by means of the photosensitive detector 4 are then digitized. The PLL 6 is moreover used as an input for an FPGA 8 and/or the counter 11 integrated thereon. In the example, a TCX oscillator 7 is again used as a precise reference time base for the counter 11. FIG. 2 schematically shows a preferred embodiment of a freely oscillating frequency comb laser 2. In the example, the fiber-based laser 2 comprises a pump diode 13, which, via fibers 14 by means of a coupler 15, couples the power in the cavity consisting of a reflector 16 combined with a saturable absorber (Bonded Semiconductor Saturable Absorber (SESAM)) and a grating 17 as the second reflector.

A section of the single-mode fiber 14 is, for example, erbium-doped. This amplifier unit causes, together with the nonlinear transmission of the SESAM, locking between the many spectral laser modes and causes a stable pulse rate of the laser emission in the lowest-order eigenstate. The laser pulses 12 have a chronological duration of less than 10 ps in this case, typically <1 ps. The pulse rate is determined by the runtime via the light route between the two resonator mirrors. The laser pulse rate can optionally be adapted by means of a change of the optical path length between the two mirrors. A percentage of the power of the pulses is conducted via the coupler 15 to the outlet 12.

The laser 2, as shown, comprises neither a pulse rate stabilization nor a CEP stabilization (CEP: carrier envelope phase), which advantageously keeps complexity, structural size, and costs low. A fiber-based laser 2 as shown additionally has a high mechanical stability in comparison to solid-state free beam lasers, for example, with respect to vibrations or shocks, which is advantageous in particular in the case of mobile distance meters.

Figure 3:
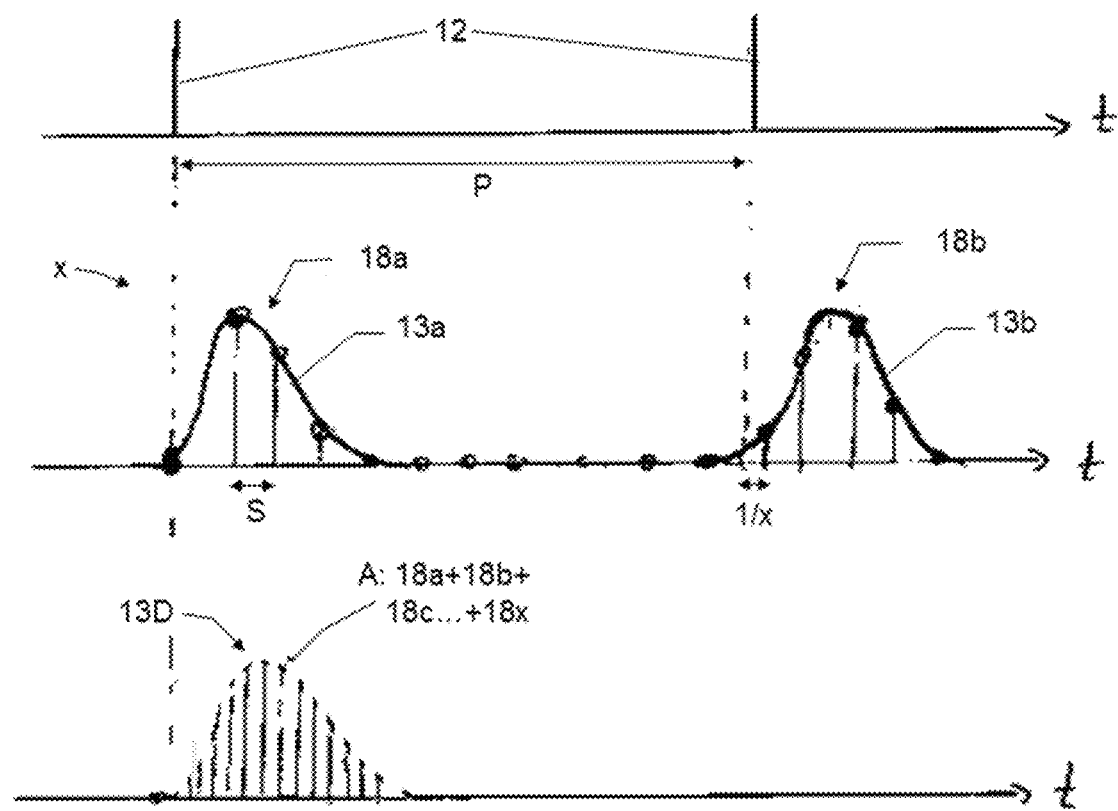
FIG. 3 shows an example of a setting of the sampling rate in relation to the pulse rate with accumulation of sampling points.

FIG. 3 illustrates an example of a setting of the sampling rate S in relation to the pulse rate P with accumulation A of sampling points 18*a*, *b* in the scope of the distance measuring method. In the three parts of the figure, the time axis is shown as the abscissa and a signal intensity is shown as the ordinate in each case.

Two of the emitted pulses 12 are shown in the upper part of FIG. 3, which are emitted at a pulse rate P symbolized as a time span, wherein the pulse rate P is preferably not fixed/stabilized, as described.

Two reception pulses or rather the respective associated reception signal 13*a*, 13*b* from a plurality x of received pulses or reception signals, respectively, are shown in the middle part of FIG. 3. They are sampled at a sampling rate S symbolized as a time span, so that sampling points are generated which comprise the relevant sampling points 18a, 18b, 18c . . . 18x of the reception signals 13a, 13b, . . . , 13x. The sampling rate S is thus set in dependence on the pulse rate P, in such a way that, as shown, a shift by 1/x is provided between two reception signal pulses. In the example P: S=P*(N+1/x) applies, wherein N is a natural number and is preferably at least equal to 100, for example, 500, 1000, or more.

In other words, the sampling rate is a non-integer multiple of the pulse rate (phase-locked), wherein in the example the offset is adapted to the number of the pulses 13a-13x and/or the sampling points 18a-18x thereof for an accumulation. After a number x, the sampling points 18a-18x then repeat with respect to the chronological position on the reception signals. The sampling pattern repeats after x emitted signals. A measurement generally comprises multiple such cycles, a shortest reasonable measurement of high quality comprises precisely one cycle of a number x.

The accumulation A of the sampling points 18a-18x is shown in the bottom part of FIG. 3. The sampling points 18a-18x are combined to form a digital reception pulse 13D, wherein the compilation takes place without assignment as already mentioned above, i.e., it is not incorporated from which "source", from which reception pulse 13a, 13b . . . , or 13x the respective sampling point originates. The compilation is a solely sequential juxtaposition of the received signal pulses modulo x.

Optionally, the above-mentioned repetition of the sampling points 18a-18x after the pulse plurality x is used to accumulate not only one "pass" of pulses x, but rather all sampling points Mx of a number M of repetitions. For example, in the case of M=4 repetitions, 4*x sampling points then result.

Figure 4:
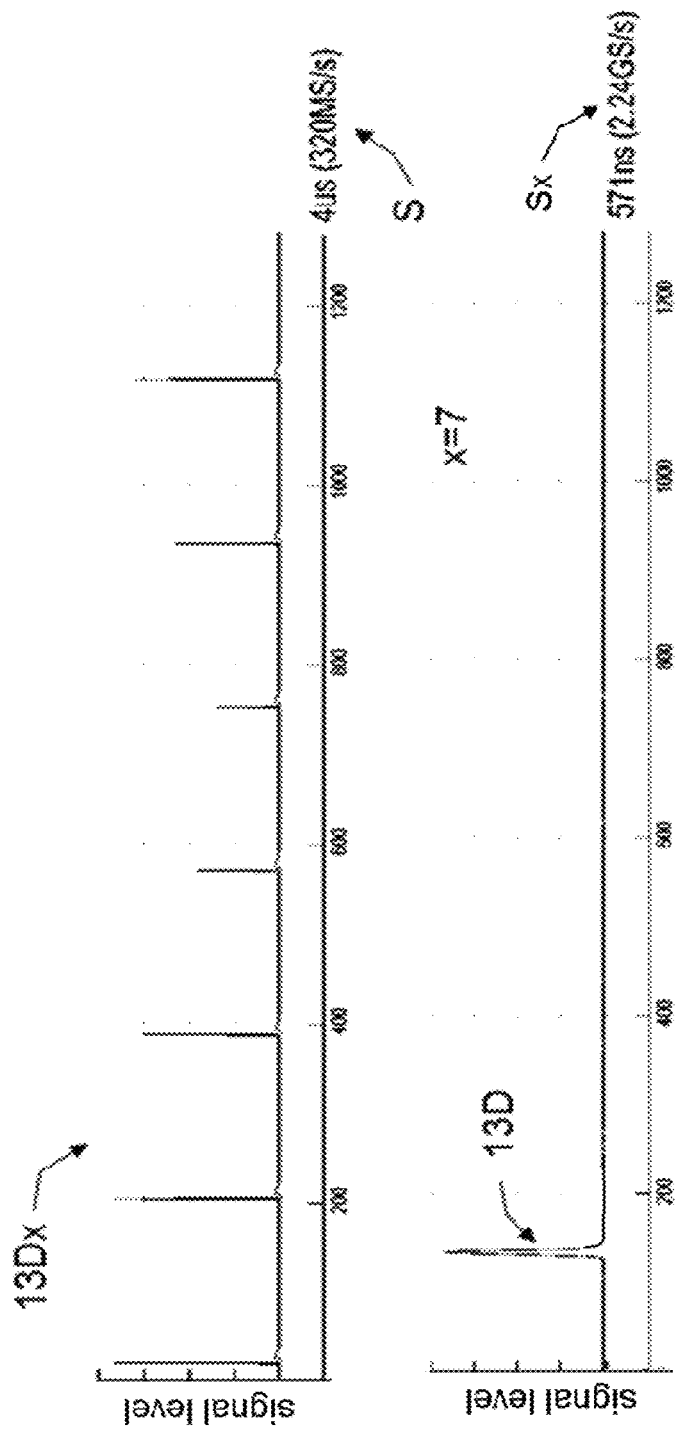
FIG. 4 shows a further example of a signal accumulation.

FIG. 4 shows a further example of a signal accumulation in the scope of the ADC conversion. In the upper part of FIG. 4, the individual digitized sampling pulses or digital signal vectors (DSV) 13Dx are shown in chronological sequence, wherein x is seven in the example. These digital signals 13Dx are generated from the analog reception pulses by sampling at the sampling rate S, which is 320 megasamples per second (MS/s) in the example.

An overall digital pulse 13D is generated (lower part of FIG. 4) from these x digital pulses 13Dx by preferably unassociated accumulation (over the timeframe of 4 µs). Due to the compilation of all sampling points, sampling is provided which corresponds to a sampling rate S*x, which in the example—since seven pulses 13Dx are used—corresponds to seven times the original sampling rate, in the example thus 2.24 gigasamples per second. By way of such a procedure, using which a multiplied sampling rate can be provided, a precise distance measurement is enabled even using simple, cost-effective components of a distance meter, among them above all an ADC converter. Furthermore, systematic errors of the electronic reception channel which have synchronous behavior average out due to the asynchronous acquisition of the reception signals.

Figure 5:
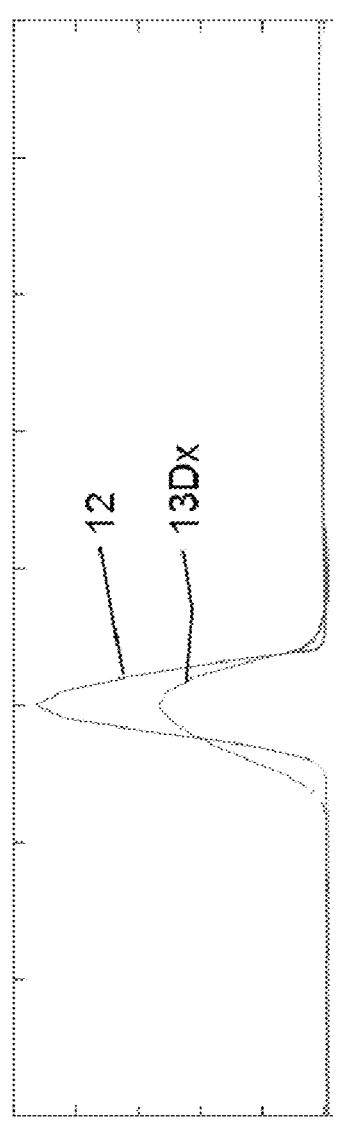
FIG. 5 shows an example of an additional shift of the sampling rate in relation to the pulse rate.

FIG. 5 illustrates how a further method of the shift of the sampling grating can be implemented as a refining option. This second method can be combined with the above-described method and also can be performed as an independent shift of the sampling rate in relation to the pulse rate. The shift takes place in this case by a fraction of typically less than 1/x of the emission pulse frequency, for example, by 0.5 ppm in relation to the pulse rate. A combination with the above-mentioned method can thus be described as follows, for example:

$S=P*(N-1/x)*(1+y)$ wherein, for example, $y=0.5$ ppm

As the sole method, in contrast, it may be described as follows:

$S=P*N*(1+y)$.

For example, at a signal measuring time or accumulation time of 15 ms, the sampling pattern shifts in relation to the pulse pattern by a total of 0.5 ppm*15 ms=7.5 ns. With unassociated compilation of the sampling points to form a single digitized pulse 13Dx, a slightly faded or blurred pulse form results. The subsamples or pulses 13Dx thus already mix after a few signal pulses and a sufficient reduction or eradication of transducer errors such as gain error, timing error, or offset error, which otherwise have an interfering effect in particular in cost-effective A/D converters, is already ensured after short measurement times.

Figure 6:
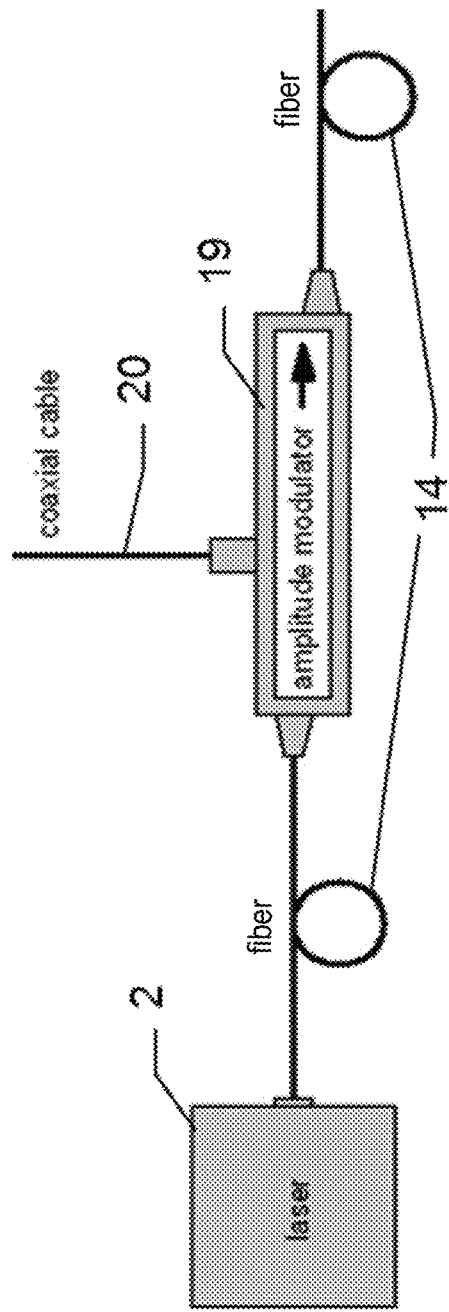
FIG. 6 shows a first embodiment for resolving measurement ambiguities.

FIG. 6 an example of a refinement of the distance meter according to the invention. A laser 2 and fibers 14 for guiding the laser light to be emitted are shown. Especially at high pulse rates, multiple light pulses are located between measuring device and target during the distance measurement, which results in distance ambiguities; an unambiguous association of a pulse with the runtime measurement is thus no longer possible. To resolve or prevent such ambiguities, the distance meter in the example of FIG. 6 comprises a (fiber-optic) amplitude modulator 19 as a variable optical attenuator, which is activated in the example via a coaxial cable 20. By means of the amplitude modulator 19, the laser pulse amplitudes are modulated (in an analog manner) in such a way that laser pulses thus become differentiable. A modulation—in the example of the amplitudes—thus takes place in such a way that laser pulses, pulse groups, or envelope curves of pulse sequences are unambiguously identifiable. The distance can thus be unambiguously determined, even in the case of thousands of pulses between measuring device and target.

Figure 7A:
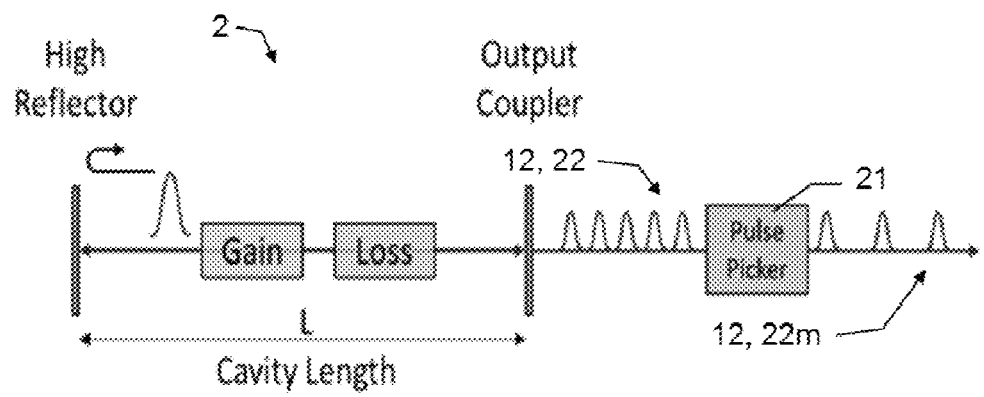
FIGS. 7a,b,c show further embodiments for resolving measurement ambiguities.
Figure 7B:
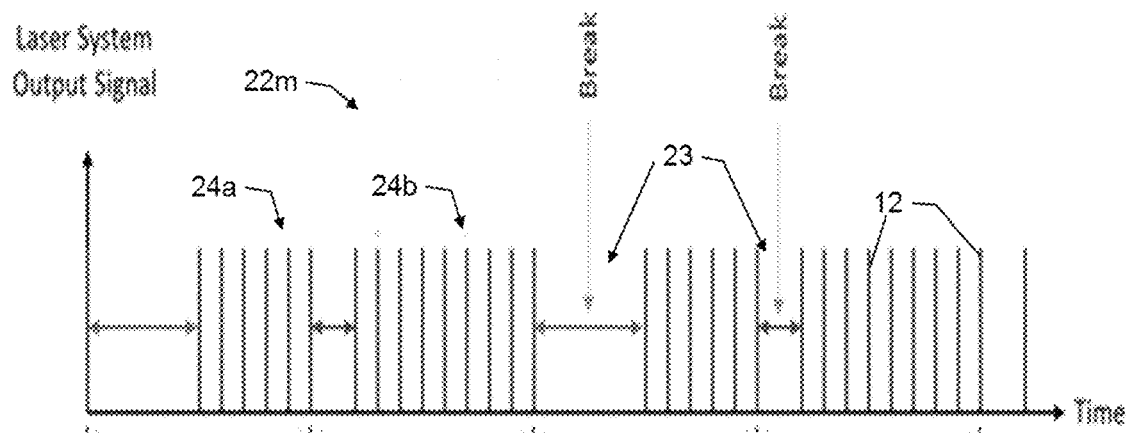

FIGS. 7a and 7b show a further form of the ambiguity resolution. In this example, a targeted selection is performed from the pulses 12 generated by the laser 2. For this purpose, the device comprises a pulse picker 21 (FIG. 7a) which picks out pulses 12 from the sequence of the laser pulses 22 generated at the pulse rate and/or suppresses a part of the pulses 12. A modified pulse sequence 22m thus results by means of this discrete modulation.

FIG. 7b shows such a modulated pulse sequence 22m of radiation pulses 12. The original pulse sequence (22 in FIG. 7a) is intentionally interrupted (arrows 23) by means of pulse picking in such a way that unambiguously identifiable "packets" 24a and 24b of pulses 12 are thus generated, on the basis of which any ambiguities can be resolved and/or avoided.

The amplitude modulation according to FIG. 6 and pulse picking according to FIGS. 7a and 7b can also be combined. As further alternative or additional refinements, a determination of the number of pulses 12 between emission and reception is performed. As a further form (not shown), the laser 2 comprises an electro-optical phase shifter in the interior of the cavity instead of externally, whereby the pulse rate is variable and at least two different pulse sequence frequencies can be provided. By measuring the reception pulses at at least two such frequencies, ambiguities can be resolved—wherein the differential frequency of the two pulse sequence frequencies specifies the maximum possible ambiguity distance—and the distance is absolutely determinable.

Figure 7C:
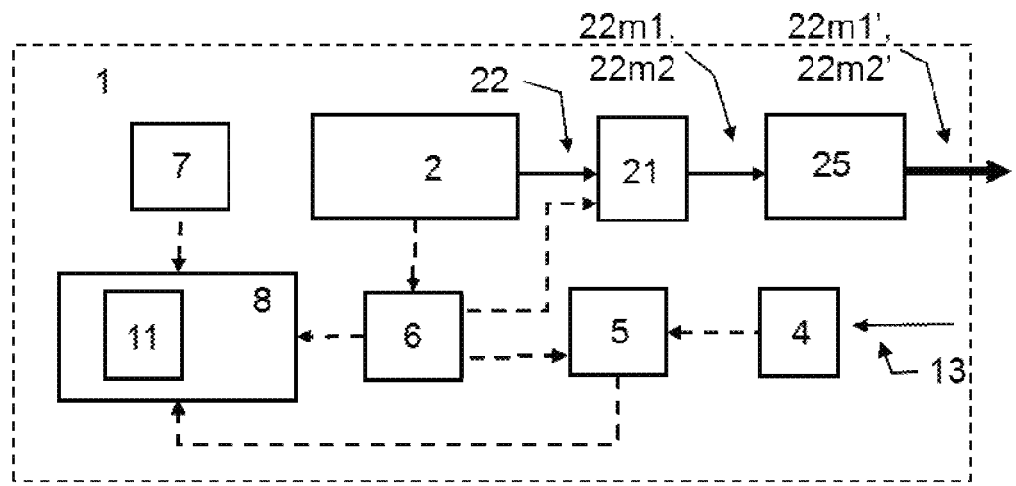

FIG. 7c shows a distance meter 1 having pulse picker 21 based on FIG. 1b. The radiation 12 or pulse sequence 22 generated by the laser 2 is modulated by means of the pulse picker 21 before it is amplified by the optical amplifier 25, so that a modulated and amplified radiation pulse sequence 22m1' is emitted. The pulse picking is performed on the basis of a signal of the PLL 6. For example, in the case of an "original" pulse rate generated by the laser 2 of 100 MHz, only every one-hundredth pulse is transmitted, so that radiation 22 is emitted at an effective pulse rate of 1 MHz. If the (mean) power of the laser is 1 mW, for example, it is 1 µW after the pulse picker and is then amplified by the amplifier to 10 mW.

In the example, the PLL 6 moreover regulates the modulation of the generated pulse sequence 22 in such a way that in addition to the first pulse sequence 22m1, for example, having every one-hundredth pulse, a second modulated pulse sequence 22m2 is generated, for example, with transmission of every one-hundred-tenth pulse. On the one hand, a distance measurement thus takes place at a first pulse frequency of, for example, 1 MHz, and on the other hand, at a second frequency of, for example, 909 kHz. The analysis of the synthetic intermediate frequency of 90.9 kHz thus resulting resolves ambiguities at a distance of up to 1650 m.

It is obvious that these illustrated figures only schematically illustrate possible exemplary embodiments. The various approaches can also be combined with one another and with devices or methods of the prior art.

What is claimed is:

1. An electro-optical distance meter comprising:
   a radiation source for generating pulsed radiation at a pulse rate;
   an objective and a photosensitive component for receiving a fraction of the pulses reflected from a target object and converting it into a reception signal;
   an analog-to-digital converter for generating a digitized pulse by means of sampling of the reception signal at a sampling rate; and
   an electronic analysis unit, which determines a distance between distance meter and target object on the basis of a measurement of time between emission and reception of an optical pulse by means of the digitized pulse,
   wherein the distance meter comprises a sampling functionality, upon the execution of which the sampling rate is set in dependence on the pulse rate and the sampling for generating the digitized pulse is performed over the reception signals of a plurality of received radiation pulses, and
   wherein the distance meter comprises at least one independent clock generator for generating an independent clock rate, wherein upon execution of the sampling functionality, the sampling rate and the pulse rate are set on the basis of the clock rate, or such that the absolute frequency of the radiation is progressively determinable on the basis of the clock rate, and the distance meter is designed to continuously compute a sampling-to-distance factor so that the distance determination is enabled with a scale error less than 10 ppm.

2. The distance meter according to claim 1, wherein the radiation source is a freewheeling, non-frequency-stabilized frequency comb laser.

3. The distance meter according to claim 1, wherein the distance meter is designed to measure the pulse rate and to set the sampling rate in dependence on the measured pulse rate.

4. The distance meter according to claim 1, wherein:
   the photosensitive electrical component has a bandwidth in the gigahertz range,
   the distance meter comprises a fiber-optic radiation amplifier, or
   the distance meter comprises an internal reference target, on the basis of which an optical reference path can be provided, so that an absolute referencing of the distance ascertainment is enabled.

5. The distance meter according to claim 1, wherein, in order to resolve ambiguities in the ascertainment of the distance, the distance meter comprises:
   a modulator for modulating the laser pulses, or
   an electro-optical phase shifter in the interior of a cavity of the laser for generating at least two different pulse sequence frequencies.

6. The distance meter according to claim 1, wherein:
   the distance meter is designed for spectral interferometry in the scope of the distance determination.

7. The distance meter according to claim 1, wherein:
   the sampling rate is set at least ten times as large as the pulse rate.

8. The distance meter according to claim 1, wherein:
   upon execution of the sampling functionality the pulse rate is measured and the sampling rate is set in dependence on the measured pulse rate.

9. The distance meter according to claim 1, wherein the pulse rate and, adapted thereto, the sampling rate are set on the basis of predetermined clock rates generated by means of the independent clock generator.

10. The distance meter according to claim 1, wherein:
    the sampling rate is set in a ratio to the pulse rate such that:
    the sampling rate is a non-integer multiple of the pulse rate, or
    the sampling rate is less than the bandwidth of the receiving unit.

11. The distance meter according to claim 1, wherein:
    the digitized pulse is generated by the sampling points of the plurality of the received radiation pulses:
    being accumulated, or
    being used to optimize parameter values of at least one polynomial describing the pulse.

12. The distance meter according to claim 11, wherein:
    the sampling points repeat after the plurality x and Mx sampling points are used for generating the digitized pulse, where M is a natural number.

13. The distance meter according to claim 1, wherein:
    the sampling rate:
    is set shifted in relation to the pulse rate by a fraction less than 1/x, where there are x number of sampling points, or
    is set algorithmically.

14. The distance meter according to claim 1, wherein:
    to avoid ambiguities in the distance determination, a discrete or analog modulation of a radiation pulse sequence is performed by means of an amplitude modulator.

* * * * *